(12) United States Patent
Kim et al.

(10) Patent No.: US 8,681,251 B2
(45) Date of Patent: Mar. 25, 2014

(54) IMAGE DATA PROCESSING METHOD, IMAGE SENSOR AND IMAGE DATA PROCESSING SYSTEM USING THE METHOD

(75) Inventors: Jin-Woo Kim, Seoul (KR); Kyung-Min Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 286 days.

(21) Appl. No.: 13/154,537

(22) Filed: Jun. 7, 2011

(65) Prior Publication Data

US 2011/0298957 A1 Dec. 8, 2011

(30) Foreign Application Priority Data

Jun. 8, 2010 (KR) .................. 10-2010-0053991

(51) Int. Cl.
*H04N 3/14* (2006.01)
*H04N 5/335* (2011.01)

(52) U.S. Cl.
USPC .......................................................... 348/305

(58) Field of Classification Search
USPC .......................................................... 348/305
See application file for complete search history.

(56) References Cited

U.S. PATENT DOCUMENTS

| | | | | |
|---|---|---|---|---|
| 6,747,700 | B1 * | 6/2004 | Funakoshi et al. | 348/308 |
| 7,679,665 | B2 * | 3/2010 | Egawa et al. | 348/305 |
| 7,719,584 | B2 * | 5/2010 | Hiyama et al. | 348/294 |
| 7,728,891 | B2 * | 6/2010 | Hiyama et al. | 348/294 |
| 8,045,031 | B2 * | 10/2011 | Cieslinski | 348/308 |
| 2003/0011829 | A1 * | 1/2003 | Dierickx | 358/513 |
| 2009/0316026 | A1 * | 12/2009 | Okumura | 348/281 |
| 2010/0026814 | A1 * | 2/2010 | Shimoda | 348/207.1 |
| 2011/0037871 | A1 * | 2/2011 | Suzuki | 348/222.1 |
| 2011/0149136 | A1 * | 6/2011 | Johnson | 348/308 |

FOREIGN PATENT DOCUMENTS

| | | |
|---|---|---|
| JP | 2001-160925 A | 6/2001 |
| JP | 2007-150448 A | 6/2007 |
| JP | 2009-136023 A | 6/2009 |
| KR | 10-2005-0121632 A | 12/2005 |

* cited by examiner

*Primary Examiner* — Albert Cutler
(74) *Attorney, Agent, or Firm* — Lee & Morse, P.C.

(57) ABSTRACT

An image sensor supporting a normal sampling mode and a 1/N sampling mode for transmitting image data detected by a plurality of unit image sensors and stored in a plurality of latch circuits to a data processor using a plurality of transmission lines, wherein N is a natural number greater than 2, the image sensor including a horizontal address generator configured to generate horizontal addresses corresponding to addresses of the plurality of latch circuits, and to generate, based on the horizontal addresses, a first channel selection control signal and a second channel selection control signal of which activation times at least partially overlap.

18 Claims, 7 Drawing Sheets

| SHA\HA | R1, R2 | R3, R4 | R5, R6 | R7, R8 | R9, R10 | R11, R12 | R13, R14 | R15, R16 | R17, R18 | R19, R20 | R21, R22 |
|---|---|---|---|---|---|---|---|---|---|---|---|
| 1/1 | 0 | 1 | 2 | 3 | 4 | 5 | 6 | 7 | 8 | 9 | 10 |
| 1/2 | 0 |   | 2 |   | 4 |   | 6 |   | 8 |   | 10 |
| 1/3 | 0 |   |   | 3 |   |   | 6 |   |   | 9 |   |
| 1/4 | 0 |   |   |   | 4 |   |   |   | 8 |   |   |
| 1/5 | 0 |   |   |   |   | 5 |   |   |   |   | 10 |

IMAGE DATA PROCESSING METHOD, IMAGE SENSOR AND IMAGE DATA PROCESSING SYSTEM USING THE METHOD

CROSS-REFERENCE TO RELATED APPLICATIONS

This application claims priority under 35 U.S.C. §119 to Korean Patent Application No. 10-2010-0053991, filed on Jun. 8, 2010, in the Korean Intellectual Property Office, and entitled: "Image Data Processing Method, Image Sensor and Image Data Processing System Using the Method," which is incorporated by reference herein in its entirety.

BACKGROUND

1. Field

Embodiments relate to an image data processing method, and more particularly, to an image data processing method that supports both a normal sampling mode and a 1/N sub-sampling mode when processing image data using a multi-channel.

2. Description of the Related Art

Complementary metal-oxide semiconductor (CMOS) image sensors convert an image signal applied to a unit image sensor including a photodiode into an electrical signal. The resolution of a CMOS image sensor is determined by the number of unit image sensors installed in the CMOS image sensor. The number of unit image sensors that installed in CMOS image sensors is recently increasing in order to increase the resolution of CMOS image sensors. In addition, since CMOS image sensors require rapid data processing speeds as well as high resolutions, time periods allocated to sequentially read image signals detected by a plurality of unit image sensors and to store the image signals are also being reduced. In order to shorten a data processing time, a plurality of channels, instead of a single channel, may be used. Under different conditions, even if the resolution of a CMOS image sensor is decreased, sub-sampling for reducing the size of image data may be employed.

SUMMARY

One or more embodiments may provide an image sensor configured to support a normal sampling mode and a 1/N sub-sampling.

One or more embodiments may provide an image data processing method configured to support a normal sampling mode and a 1/N sub-sampling.

One or more embodiments may provide an image data processing system configured to support a normal sampling mode and a 1/N sub-sampling.

One or more embodiments may provide an image sensor supporting a normal sampling mode and a 1/N sub-sampling mode, the image sensor including a sample and hold array including a plurality of latch circuits configured to store image data detected by a plurality of unit image sensors included in an image sensor array, a 2-channel transmission line block configured to connect image data output from the plurality of latch circuits to four transmission lines, and a horizontal address generator for generating a first channel selection control signal and a second channel selection control signal configured to control ON/OFF and ON/OFF times of a plurality of switches, according to a horizontal address corresponding to addresses of the plurality of latch circuits, wherein times during which the first channel selection control signal and the second channel selection control signal corresponding to the ON/OFF times of the switches are activated at least partially overlap, and N is a natural number greater than 2.

Each of the latch circuits may include an output terminal that is connected to the four transmission lines via four separated switches; the first channel selection control signal controls ON/OFF operations of the switches for connecting two adjacent latch circuits, from among the plurality of latch circuits, to two of the four transmission lines, and the second channel selection control signal controls ON/OFF operations of the switches for connecting two adjacent latch circuits adjacent to the latch circuits selected by the first channel selection control signal, from among the plurality of latch circuits, to the remaining two transmission lines.

When the first channel selection control signal and the second channel selection control signal partially overlap, the horizontal address may be output in series from one horizontal address decoder included in the horizontal address generator.

Times during which the first channel selection control signal and the second channel selection control signal are activated overlap by about 50%.

The horizontal address generator may include a first D-type flip-flop configured to output the horizontal address as the first channel selection control signal via a positive output terminal of the first D-type flip-flop in accordance with a first clock signal, wherein the horizontal address is applied to an input terminal of the first D-type flip-flop, and a second D-type flip-flop configured to output the horizontal address as the second channel selection control signal via a positive output terminal of the second D-type flip-flop in accordance with a second clock signal, wherein the horizontal address is applied to an input terminal of the second D-type flip-flop, wherein the first clock signal and the second clock signal have the same frequency and different phases.

The phases of the first clock signal and the second clock signal may be different by a half period.

An ON/OFF time of the first channel selection control signal may be from a rising edge of the first clock signal to a next rising edge of the first clock signal, and an ON/OFF time of the second channel selection control signal may be from a rising edge of the second clock signal to a next rising edge of the second clock signal.

In the 1/N sub-sampling mode, the horizontal address decoder may output, in series, horizontal addresses on which 1/N sub-sampling is to be performed.

When the first channel selection control signal and the second channel selection control signal are activated entirely overlap, the addresses of the plurality of latch circuits may be divided by two horizontal address decoders and then the addresses may be output as a first horizontal address and a second horizontal address, the first channel selection control signal may be activated in response to the first horizontal address output from a first horizontal address decoder, and the second channel selection control signal may be activated in response to the second horizontal address output from a second horizontal address decoder.

In the 1/N sub-sampling mode, the addresses of the plurality of latch circuits on which 1/N sampling is to be performed may be alternatively assigned to the first horizontal address decoder and the second horizontal address decoder.

The sensor may include a column amplifying array for amplifying image data detected by the plurality of unit image sensors constituting the image sensor array and for transmitting the image data to the sample & hold array.

One or more embodiments may provide an image data processing method of an image sensor for supporting both a normal sampling mode and a 1/N sub-sampling mode and for transmitting image data detected by a plurality of unit image sensors and stored in a plurality of latch circuits to a data processor using four transmission lines, the method including generating at least one horizontal address corresponding to addresses of a plurality of the latch circuits, and generating a first channel selection control signal and a second channel selection control signal of which activation times at least partially overlap, wherein N is a natural number greater than 2.

Each of the plurality of latch circuits may include an output terminal that is connected to the four transmission lines via the separated four switches; the first channel selection control signal controls ON/OFF operations of the switches for connecting two adjacent latch circuits, from among the plurality of latch circuits, to two of the four transmission lines; and the second channel selection control signal controls ON/OFF operations of the switches for connecting two adjacent latch circuits adjacent to the latch circuits selected by the first channel selection control signal, from among the plurality of latch circuits, to the remaining two transmission lines.

When activations of the first channel selection control signal and the second channel selection control signal partially overlap, the first channel selection control signal and the second channel selection control signal may be generated using one horizontal address.

The first channel selection control signal and the second channel selection control signal may be generated using two clock signals having a same frequency and different phases.

The activation time of the first channel selection control signal may be from a rising edge of a first clock signal to a next rising edge of the first clock signal, and the activation time of the second channel selection control signal may be from a rising edge of a second clock signal to a next rising edge of the second clock signal.

When the image sensor operates in the normal sampling mode, the horizontal address has information about all addresses of the plurality of latch circuits, and when the image sensor operates in the sub-sampling mode, the horizontal address has information about addresses selected according to a sampling ratio from among the addresses of the plurality of latch circuits, and in both the normal sampling mode and the sub-sampling mode, the first channel selection control signal and the second channel selection control signal are alternatively activated.

When the first channel selection control signal and the second channel selection control signal are activated entirely overlap, the method may include dividing the horizontal address into a first horizontal address and a second horizontal address, activating the first channel selection control signal in correspondence to the first horizontal address, and activating the second channel selection control signal in correspondence to the second horizontal address.

One or more embodiments may provide an image data processing system supporting both a normal sampling mode and a 1/N sub-sampling mode, the system including a 2-channel transmission line block configured to connect image data detected by a plurality of unit image sensors and stored in a plurality of latch circuits to four transmission lines, and a horizontal address generator configured to generate a first channel selection control signal and a second channel selection control signal for controlling ON/OFF and ON/OFF times of a plurality of switches, according to a horizontal address corresponding to addresses of the plurality of latch circuits, wherein times during which the first channel selection control signal and the second channel selection control signal corresponding to the ON/OFF times of the switches are activated at least partially overlap, and N is a natural number greater than 2.

The image data processing system may be a complementary metal-oxide-semiconductor (CMOS) image sensor (CIS).

One or more embodiments may provide an image sensor supporting a normal sampling mode and a 1/N sub-sampling mode for transmitting image data detected by a plurality of unit image sensors and stored in a plurality of latch circuits to a data processor using a plurality of transmission lines, wherein N is a natural number greater than 2, the image sensor including a horizontal address generator configured to generate at least one horizontal address corresponding to the addresses of the plurality of latch circuits, and to generate, based on the at least one horizontal address, a first channel selection control signal and a second channel selection control signal of which activation times at least partially overlap.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals designate like elements throughout the specification.

In general, when image data stored in a sample & hold array is transmitted to a data processor, a plurality of switches selected by a first channel selection control signal Channel-1-Selection connect to two adjacent transmission lines from among four transmission lines, regardless of whether a sampling mode is a normal sampling mode or a 1/N sub-sampling mode (N is a natural number greater than 2), and a plurality of switches selected by a second channel selection control signal Channel-2-Selection connect to the remaining two adjacent transmission lines. In the normal sampling mode, all image data stored in the sample & hold array is transmitted to the data processor. In the 1/N sub-sampling mode, a part of the image data stored in the sample & hold array is sampled and then transmitted to the data processor.

However, in one or more embodiments, e.g., when all or a part of the image data stored in the sample & hold array is transmitted to the data processor, all four transmission lines are used in both the normal sampling mode and the 1/N sub-sampling mode. Thus, one or more embodiments may provide a circuit of the data processor that is able to transmit only a part of the image data in the 1/N sub-sampling mode without having to be changed.

In one or more embodiments, when an image sensor transmits data to four transmission lines, two transmission lines are simultaneously selected, and thus the four transmission lines are operated in a 2-channel manner. Accordingly, when the four transmission lines are used, 2-channel data transmission is assumed.

In the 1/N sub-sampling mode, when N is 2, only half of image data stored in a plurality of latch circuits is sampled, and when N is 3, only a third of the image data is sampled.

Figure 1:
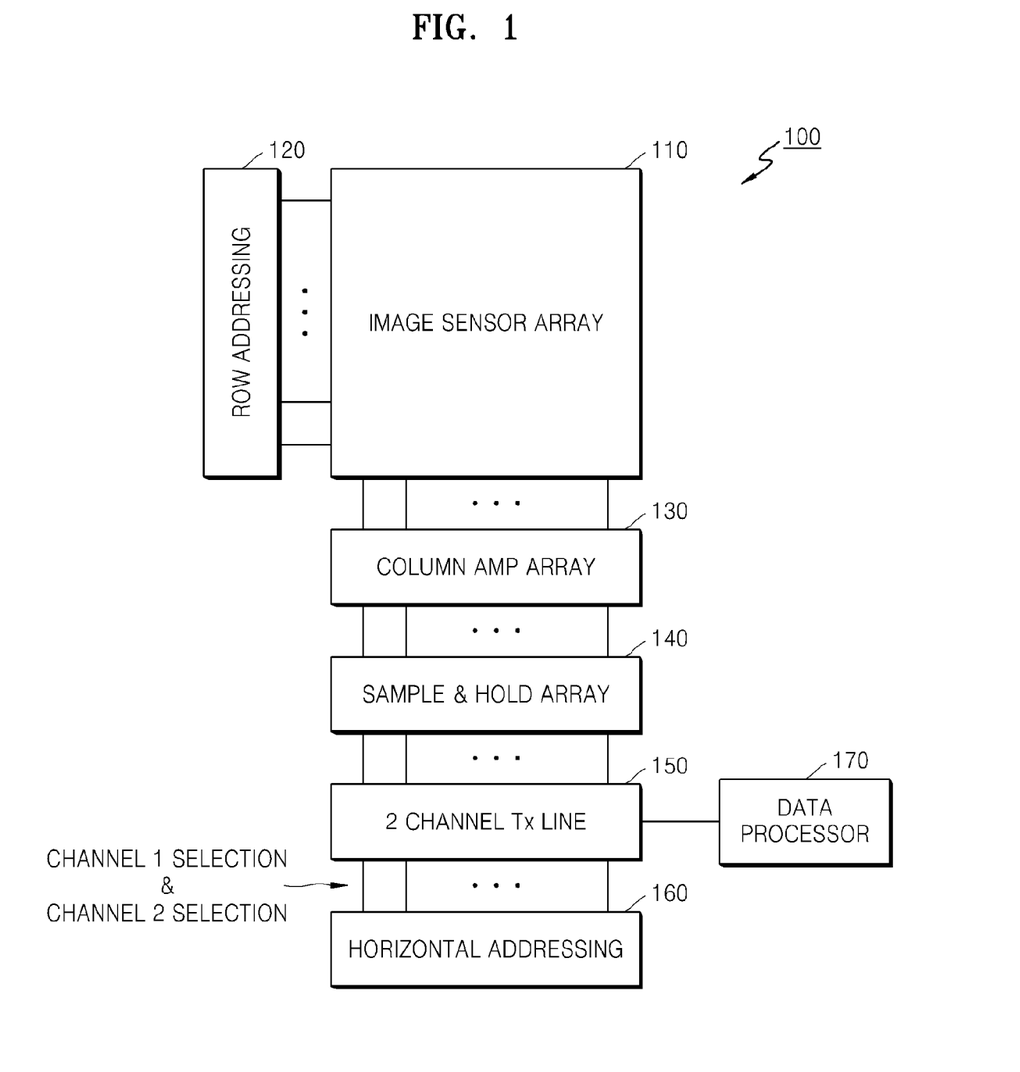
FIG. 1 illustrates a block diagram of an exemplary embodiment of an image sensor.

FIG. 1 illustrates a block diagram of an exemplary embodiment of an image sensor 100.

Referring to FIG. 1, the image sensor 100 may include an image sensor array 110, a vertical address generator 120, a column amplifying array 130, a sample & hold array 140, a 2-channel transmission line block 150, a horizontal address generator 160, and a data processor 170.

A plurality of unit image sensors (not shown) may be arranged in the image sensor array 110 in a two-dimensional array. Each of the unit image sensors may include a circuit for detecting an image signal input thereto. More particularly, e.g., a complementary metal-oxide semiconductor (CMOS) image sensor may employ a photodiode.

The vertical address generator 120 may generate a vertical address signal for selecting a plurality of the unit image sensors in a horizontal line, e.g. a row of the array 110.

The column amplifying array 130 may include a plurality of amplifiers for amplifying image data output from the plurality of unit image sensors included in the horizontal line selected by the vertical address signal output from the vertical address generator 120.

The sample & hold array 140 may include a plurality of latch circuits (not shown) for sampling the image data amplified by the column amplifying array 130 and storing the sampled image data.

The 2-channel transmission line block 150 may include, e.g., four transmission lines (not shown). Each of the latch circuits of the sample & hold array 140 may include an output terminal that is connected to the four transmission lines by four switches.

The horizontal address generator 160 may generate a first channel selection control signal Channel-1-Selection and a second channel selection control signal Channel-2-Selection. The first channel selection control signal Channel-1-Selection and the second channel selection Channel-2-Selection may control an ON/OFF state of the plurality of switches.

The data processor 170 may receive image data stored in the latch circuits by operation of the respective switches that are turned-on in response to the first channel selection control signal Channel-1-Selection and the second channel selection control signal Channel-2-Selection.

In conventional circuits, when image data is transmitted using only one or some of the four transmission lines, an error occurs, and thus, in such conventional circuits the 1/N sub-sampling mode using only one or some of the four transmission lines is not supported.

In one or more embodiments, although it is not shown in detail in FIG. 1, the data processor 170 may be designed to process signals transmitted through the four transmission lines. More particularly, in one or more embodiments, when signals are not applied to all of the four transmission lines, that is, when image data is transmitted to only one or some of the four transmission lines, the one or some transmission lines to which data has been transmitted may transmit the respective image data (e.g., the transmitted data), and the one or more transmission lines to which image data is not transmitted may be subjected a high-impedance state value during data processing. In one or more embodiments, in the normal sampling mode, the data processor 170 may transmit image data through all of the four transmission lines without generating an error, and in the 1/N sub-sampling mode, image data may be transmitted to only one or some the four transmission lines without generating an error.

Figure 2:
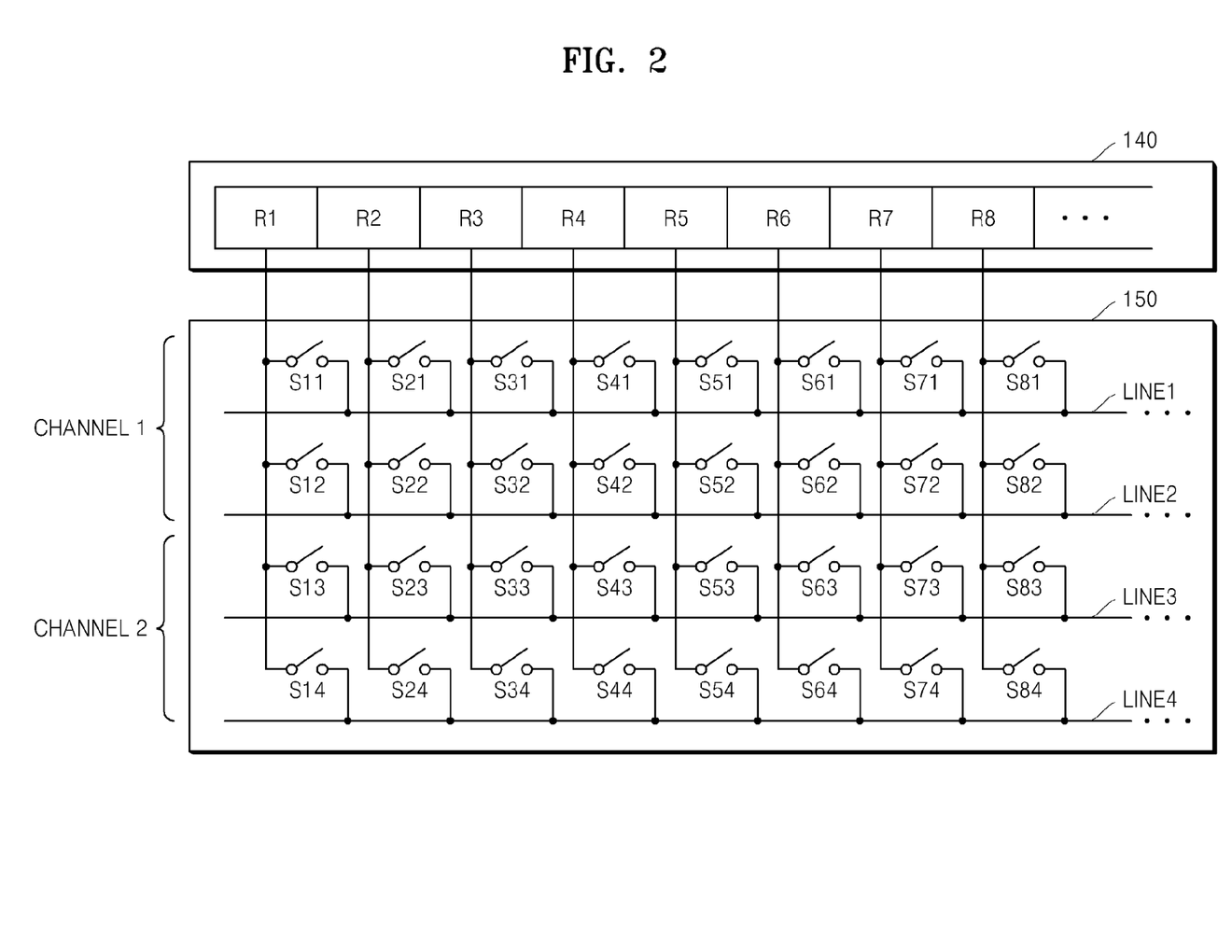
FIG. 2 illustrates a schematic diagram of an exemplary embodiment of a sample & hold array and a 2-channel transmission line block.

FIG. 2 illustrates a schematic diagram of an exemplary embodiment of the sample and hold array 140 and the 2-channel transmission line 150 of FIG. 1.

Referring to FIG. 2, the sample and hold array 140 may include a plurality of latch circuits R1 through R8. The 2-channel transmission line block 150 may include adjacent first through fourth transmission lines Line1 through Line4 and a plurality of switches S11 through S14, S21 through S24, . . . , and S81 through S84.

Each of the plurality of latch circuits R1 through R8 may include an output terminal that is connected to the four transmission lines Line1 through Line4 via four switches. That is, the first latch circuit R1 may have an output terminal that is connected to the first transmission line Line1 via a first switch S11, connected to the second transmission line Line2 via a second switch S12, connected to the third transmission line Line3 via a third switch S13, and connected to the fourth transmission line Line4 via a fourth switch S14. The second latch circuit R2 through the eighth latch circuit R8 may include the same structures as the first latch circuit R1. In the current embodiment, the reference numerals of the plurality of latch circuits R1 through R8 begin with 1, but embodiments are not limited thereto. For example, the first latch circuit may have a reference numeral of 0.

In one or more embodiments, the first channel selection control signal Channel-1-selection may control ON/OFF states and ON/OFF times of the switches connected to the adjacent first and second transmission lines Line1 and Line2 among the four transmission lines, and the second channel selection control signal Channel-2-Selection may control ON/OFF states and ON/OFF times of the switches connected to the adjacent third and fourth transmission lines Line3 and Line4. More particularly, e.g., in the normal sampling mode, the first channel selection control signal Channel-1-Selection may control ON/OFF states of the switches connected to the first and second transmission line Line1 and Line2 from among the switches connected to the first and second latch circuit R1 and R2, and the second channel selection control signal Channel-2-Selection may control ON/OFF states of the switches connected to the third and fourth transmission lines Line3 and Line4 from among the switches connected to the third and fourth latch circuits R3 and R4.

In the exemplary embodiments described herein, with regard to reference numerals employed to identify the switches in the corresponding Figures, a letter S denotes a switch, and a first number denotes a corresponding latch circuit and a second number denotes a transmission line. For example, of the four switches connected to the third latch circuit R3, the first number of each of the reference numerals of the four switches denotes the third latch circuit R3, that is, 3. The second number of each of the reference numerals of the switches connected to the first transmission line (Line1) is 1 and the second number of each of the reference numerals of the switches connected to the second transmission line (Line2) is 2.

The image sensor 100 may be operated according to various methods.

In one or more embodiments, the first channel selection control signal Channel-1-Selection and the second channel selection control signal Channel-2-Selection may be generated using a horizontal address output in series from a single horizontal address decoder, and times during which the generated first channel selection control signal Channel-1-Selection and the second channel selection control signal Channel-2-Selection are activated may partially overlap.

In one or more other embodiments, the first channel selection control signal Channel-1-Selection and the second channel selection control signal Channel-2-Selection may be respectively generated using two horizontal addresses, which may be output in series from two horizontal address decoders, and times during which the generated first channel selection control signal Channel-1-Selection and the second channel selection control signal Channel-2-Selection are activated may entirely overlap.

Hereinafter, an exemplary method employing a single horizontal address decoder will be described below in more detail.

Figure 3:
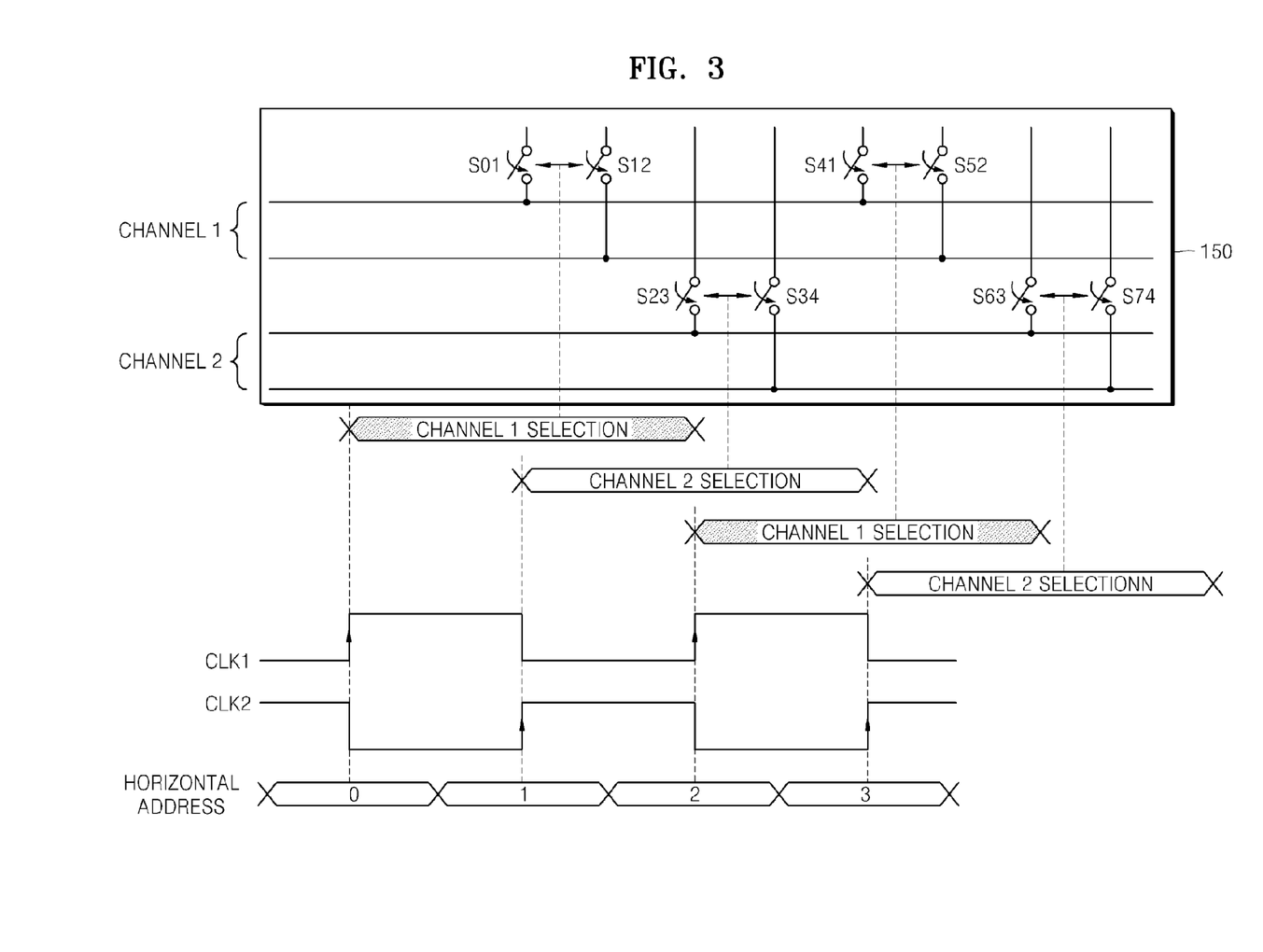
FIG. 3 illustrates a schematic diagram of ON/OFF states of a plurality of switches of the 2-channel transmission line block of FIG. 2 in a normal sampling mode.

FIG. 3 illustrates a schematic diagram of ON/OFF states of the switches of the 2-channel transmission line block 150 of FIG. 2 in a normal sampling mode.

Referring to FIG. 3, the first channel selection control signal Channel-1-Selection and the second channel selection control signal Channel-2-Selection may be generated using first and second clock signals CLK1 and CLK2 using the same horizontal address output from the single horizontal address decoder (not shown), a same frequency, and different phases. In the normal sampling mode, the horizontal address decoder may sequentially output all addresses of the plurality of latch circuits.

When the horizontal address designates a zeroth latch circuit R0, the first channel selection control signal Channel-1-Selection may be activated during a period from a rising edge of the first clock signal CLK1 to a next rising edge of the first clock signal CLK1. Then, when the horizontal address designates the first latch circuit R1, the second channel selection control signal Channel-2-Selection may be activated during a period from a rising edge of the second clock signal CLK2 to a next rising edge of the second clock signal CLK2. The first clock signal CLK1 and the second clock signal CLK2 may have different phases, e.g., the phases of the first clock signal and the second clock signal may be different by, e.g., a half period, and times during which the first channel selection control signal Channel-1-Selection and the second channel selection control signal Channel-2-Selection are activated may at least partially overlap.

When the first channel selection control signal Channel-1-Selection is activated for the first time, image data output from the zeroth latch circuit R0 may be connected to the first transmission line Line1 via a switch S01, and image data output from the first latch R1 may be connected to the second transmission line Line2 via the switch S12. When the second channel selection control signal Channel-2-Selection is activated for the first time, image data output from the second latch R2 may be connected to the third transmission line Line3 via the switch S23, and image data output from the third latch R3 may be connected to the fourth transmission line Line4 via the switch S34.

When the first channel selection control signal Channel-1-Selection is activated for the second time, image data output from the fourth latch R4 may be connected to the first transmission line Line1 via the switch S41, and the image data output from the fifth latch R5 may be connected to the second transmission line Line2 via the switch S52. When the second channel selection control signal Channel-2-Selection is activated for the second time, image data output from the sixth latch R6 may be connected to the third transmission line Line3 via the switch S63, and image data output from the seventh latch R7 may be connected to the fourth transmission line Line4 via the switch S74.

Figure 4:
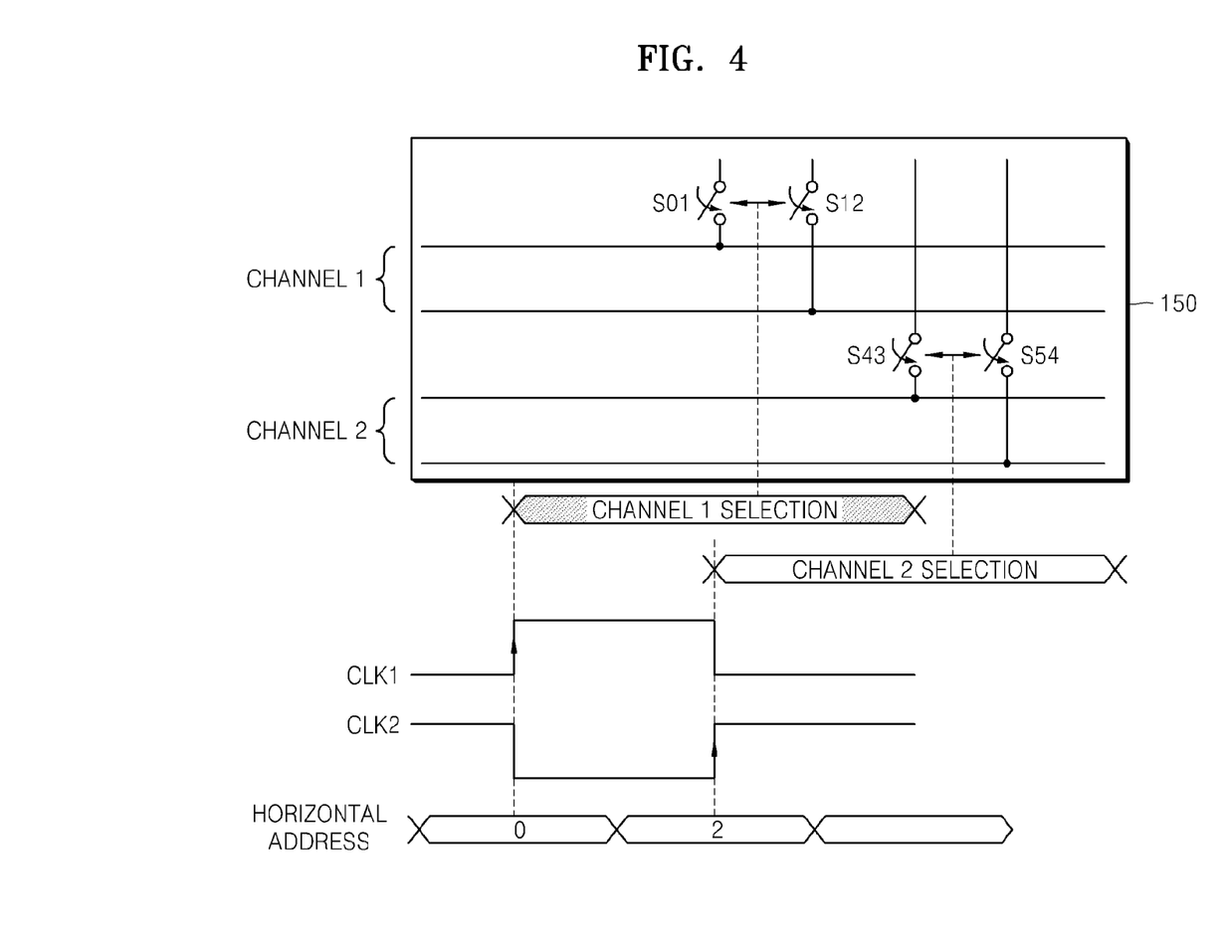
FIG. 4 illustrates a schematic diagram of ON/OFF states of a plurality of switches of the 2-channel transmission line block of FIG. 2 in a 1/N sub-sampling mode.

The first channel selection control signal Channel-1-Selection and the second channel selection control signal Channel-2-Selection may be alternately and repeatedly activated. In FIGS. 3 and 4, times during which the first channel selection control signal Channel-1-Selection and the second channel selection control signal Channel-2-Selection are activated overlap by about 50%, but embodiments are not limited thereto, i.e., the rate of overlap between may vary and be more or less than 50%.

FIG. 4 illustrates a schematic diagram of ON/OFF states of the plurality of switches included in the 2-channel transmission line block 150 in the 1/N sub-sampling mode according to an exemplary embodiment.

Referring to FIG. 4, when N is 2, that is, in a 1/2 sub-sampling mode, the horizontal address is set to designate every other latch circuits of the plurality of latch circuits. That is, the horizontal address is set to designate 0, 2, 4, etc.

Referring to FIG. 4, when N is 2, that is, in a 1/2 sub-sampling mode, the horizontal address is set to designate every other latch circuit of the plurality of latch circuits. For example, when N is 2, half of the latch circuits R may output respective image data. More particularly, referring to the exemplary embodiment of FIG. 4, e.g., two adjacent ones of the latch circuits may correspond to a respective one of the channels Channel 1, Channel 2 and every other pair of the latch circuits may output respective image data. In such embodiments, e.g., the horizontal address may be set to designate n, n+1, n+4, n+5, n+8, n+9, etc. such that ever other pair of latch circuits R0, R2, R4, etc. may output respective image data.

Referring to FIG. 4, e.g., when the horizontal address designates the zeroth latch circuit R0, the first channel selection control signal Channel-1-Selection is activated during a period from a rising edge of the first clock signal CLK1 to a next rising edge of the first clock signal CLK1, which is the same as in the normal sampling mode. In the 1/2 sub-sampling mode, in contrast to the normal sampling mode, a horizontal address designating the first latch circuit R1 is not output. The horizontal address may then designate the second latch circuit R2, and the second channel selection control signal Channel-2-Selection may be activated during a period from a rising edge of the second clock signal CLK2 to a next rising edge of the second clock signal CLK2.

When the first channel selection control signal Channel-1-Selection is activated, image data output from the zeroth latch R0 may be connected to the first transmission line Line1 via the switch S01, e.g., when the switch S01 is turned on, and image data output from the first latch R1 may be connected to the second transmission line Line2 via the switch S12, e.g., when the switch S12 is turned on. When the second channel selection control signal Channel-2-Selection is activated, image data output from the fourth latch R4 may be connected to the third transmission line Line3 via the switch S43, e.g., when the switch S43 is turned on, and image data output from the fifth latch R5 may be connected to the fourth transmission line Line4 via the switch S54, e.g., when the switch S54 is turned on.

Although not shown in the drawing, when the horizontal address designates the fourth latch circuit R4, image data output from the eighth and ninth latch circuits R8 and R9 may be connected to the first and second transmission lines Line1 and Line2, respectively. Then, when the horizontal address designates the sixth latch circuit R6, image data output from twelfth and thirteenth latch circuits R12 and R13 may be connected to the third and fourth transmission lines Line3 and Line4, respectively.

As illustrated in FIGS. 3 and 4, in the image sensor 100 configured according to the first method, image data corresponding to a horizontal address may be divided into the four transmission lines Line1 through Line4 not only in the normal sampling mode but also in the 1/N sub-sampling mode.

Hereinafter, another exemplary embodiment of a data processing method will be described below. In the exemplary method described above, e.g., times during which the generated first channel selection control signal Channel-1-Selection and the second channel selection control signal Channel-2-Selection are activated partially overlap. On the other hand, in one or more other exemplary embodiments, e.g., times during which the generated first channel selection control signal Channel-1-Selection and the second channel selection control signal Channel-2-Selection are activated entirely overlap.

Figure 5:
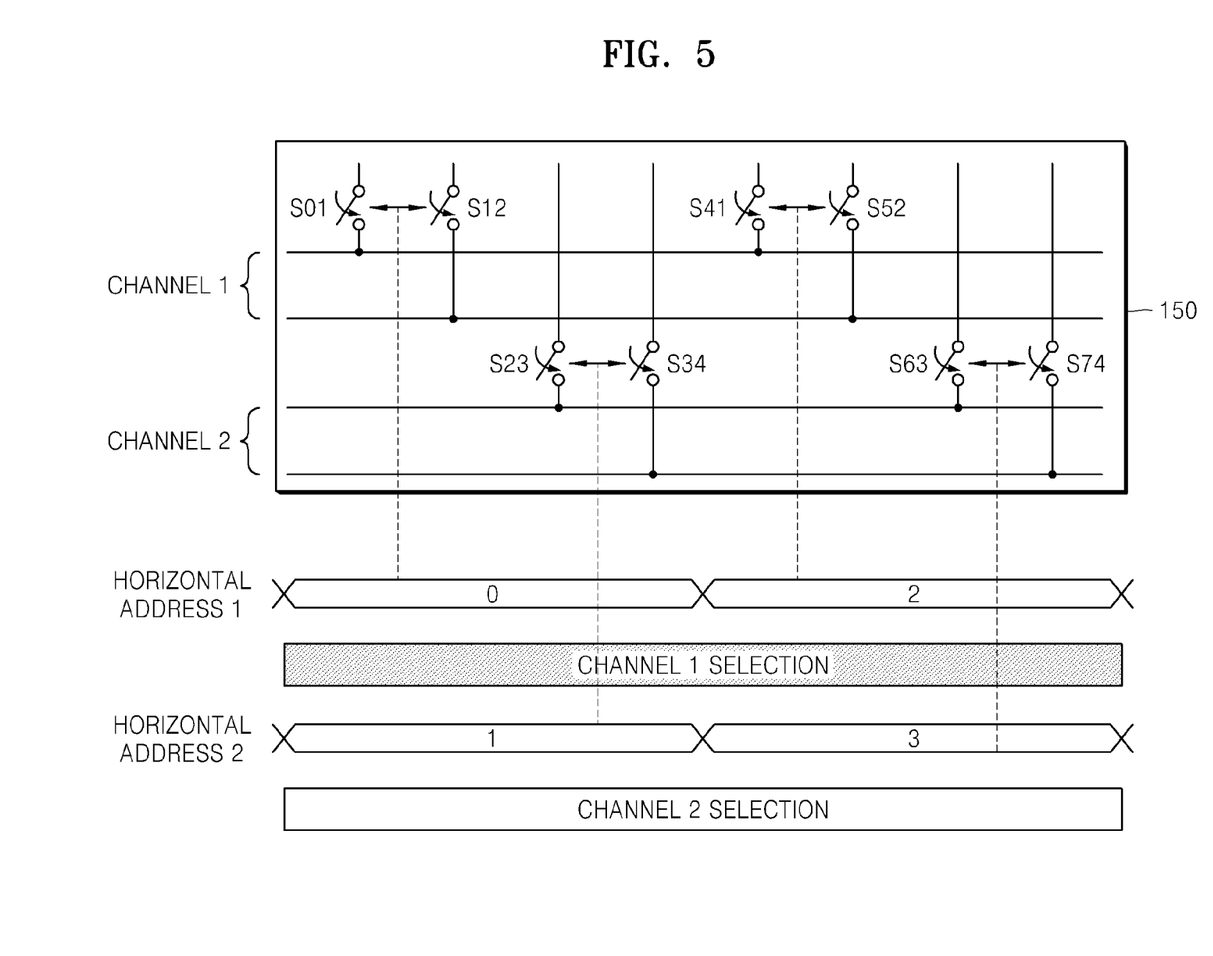
FIG. 5 illustrates a schematic diagram of ON/OFF states of a plurality of switches of a 2-channel transmission line block in a normal sampling mode, according to another exemplary embodiment.

FIG. 5 illustrates ON/OFF states of the plurality of switches of the 2-channel transmission line block 150 in a normal sampling mode, according to another exemplary embodiment.

Referring to FIG. 5, in one or more such embodiments, the first channel selection control signal Channel-1-Selection and the second channel selection control signal Channel-2-Selection may be simultaneously activated in response to a first horizontal address Horizontal Address 1 and a second horizontal address Horizontal Address 2 respectively output from two horizontal address decoders (not shown). A plurality of addresses on which 1/N sub-sampling is to be performed may be alternatively assigned to the first horizontal address Horizontal Address 1 and the second horizontal address Horizontal Address 2. For example, when the first horizontal address Horizontal Address 1 is to designate addresses 0, 2 through 2M, the second horizontal address Horizontal Address 2 is to designate addresses of 1, 3 through 2M−1, wherein M is a natural number greater than 3.

When the first channel selection control signal Channel-1-Selection is activated for the first time, image data output from the zeroth latch circuit R0 is connected to the first transmission line Line1 via the turned on switch S01, and image data output from the first latch R1 is connected to the second transmission line Line2 via the turned on switch S12. In one or more embodiments, simultaneously, the second channel selection control signal Channel-2-Selection may be activated for the first time, during which image data output from the second latch R2 may be connected to the third transmission line Line3 via the turned on switch S23, and image data output from the third latch R3 may be connected to the fourth transmission line Line4 via the turned on switch S34.

When the first channel selection control signal Channel-1-Selection is activated for the second time, image data output from the fourth latch circuit R4 is connected to the first transmission line Line1 via the turned on switch S41, and image data output from the fifth latch R5 is connected to the second transmission line Line2 via the turned on switch S52. Simultaneously, the second channel selection control signal Channel-2-Selection is activated for the second time, during which image data output from the sixth latch R6 is connected to the third transmission line Line3 via the turned on switch S63, and image data output from the seventh latch R7 is connected to the fourth transmission line Line4 via the turned on switch S74.

Figure 6:
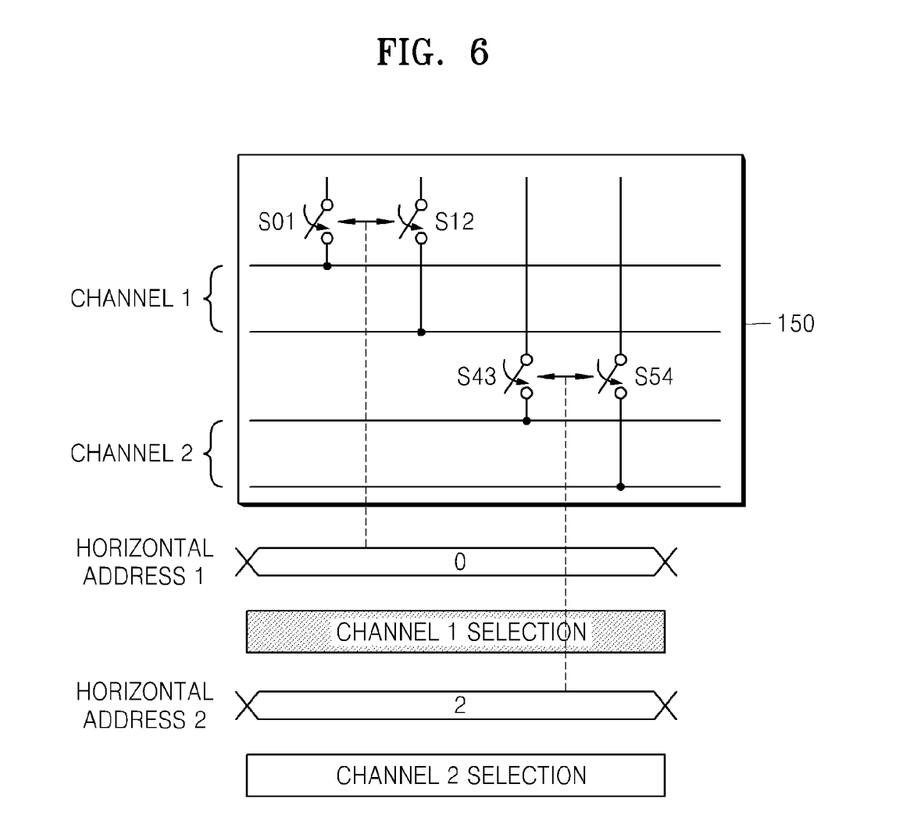
FIG. 6 illustrates a schematic diagram of ON/OFF states of a plurality of switches of a 2-channel transmission line block in a 1/N sub-sampling mode, according to another exemplary embodiment.

FIG. 6 illustrates ON/OFF states of the plurality of switches constituting the 2-channel transmission line block 150 in the 1/N sub-sampling mode, according to exemplary embodiment.

Referring to FIG. 6, when N is 2, that is, in a 1/2 sub-sampling mode, the horizontal address is set to designate every other latch circuits of the plurality of latch circuits. More specifically, the first horizontal address Horizontal Address 1 is to designate 0, 4, etc., and the second horizontal address Horizontal Address 2 is to designate 2, 6, etc.

When the first channel selection control signal Channel-1-Selection is activated for the first time, image data output from the 0th latch circuit R0 is connected to the first transmission line Line1 via the turned on switch S01, and image data output from the first latch R1 is connected to the second transmission line Line2 via the turned on switch S12. Simultaneously, the second channel selection control signal Channel-2-Selection is activated for the first time, during which image data output from the fourth latch R4 is connected to the third transmission line Line3 via the turned on switch S43, and image data output from the fifth latch R5 is connected to the fourth transmission line Line4 via the turned on switch S54.

Although not shown in the drawing, when the first horizontal address designates the fourth latch circuit R4, image data output from the eighth and ninth latch circuits R8 and R9 may be connected to the first and the second transmission lines Line1 and Line2, respectively. At the same time, the second horizontal address designates the sixth latch circuit R6, during which image data output from the twelfth and thirteenth latch circuits R12 and R13 may be connected to the third and fourth transmission lines Line3 and Line4, respectively.

The image sensor 100 configured according to either of the above-described two methods uses the four transmission lines in both the normal sampling mode and the 1/N sub-sampling mode. Thus, it is not necessary for the data processor 170 does not need to be changed to support sub-sampling.

Figure 7:
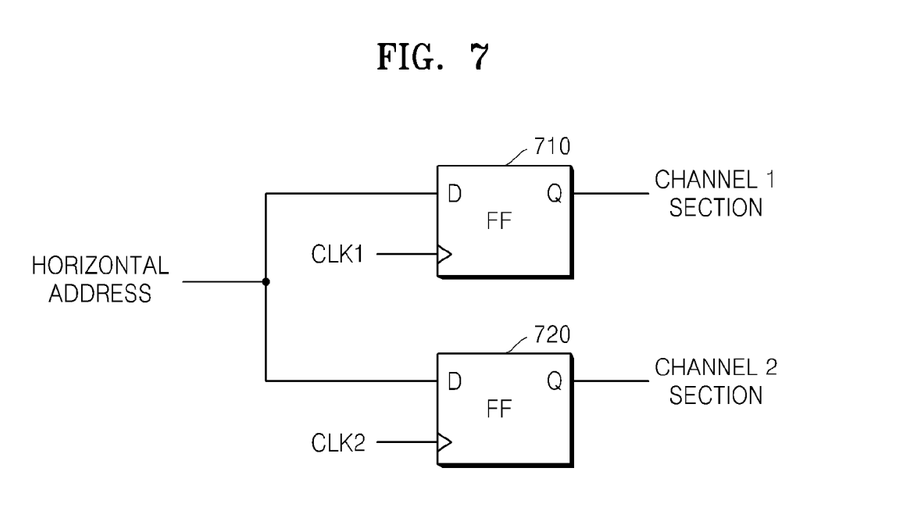
FIG. 7 illustrates a schematic diagram of an exemplary embodiment of a circuit for generating a first channel selection control signal and a second channel selection control signal using one horizontal address.

FIG. 7 illustrates a circuit for generating the first channel selection control signal Channel-1-Selection and the second channel selection control signal Channel-2-Selection using one horizontal address, according to an embodiment of the present invention.

Referring to FIG. 7, the first channel selection control signal Channel-1-Selection and the second channel selection control signal Channel-2-Selection may be generated using first and second D-type flip-flops 710 and 720.

The first D-type flip-flop 710 may output a horizontal address that is applied to an input terminal thereof as the first channel selection control signal Channel-2-Selection via a positive output terminal Q thereof. The second D-type flip-flop 720 may output a horizontal address that is applied to an input terminal thereof as the second channel selection control signal Channel-2-Selection via a positive output terminal Q thereof. At this time, the first channel selection control signal Channel-1-Selection synchronized with a first clock signal CLK1 is output, and the second channel selection control signal Channel-2-Selection synchronized with a second clock signal CLK2 is output.

Figure 8:
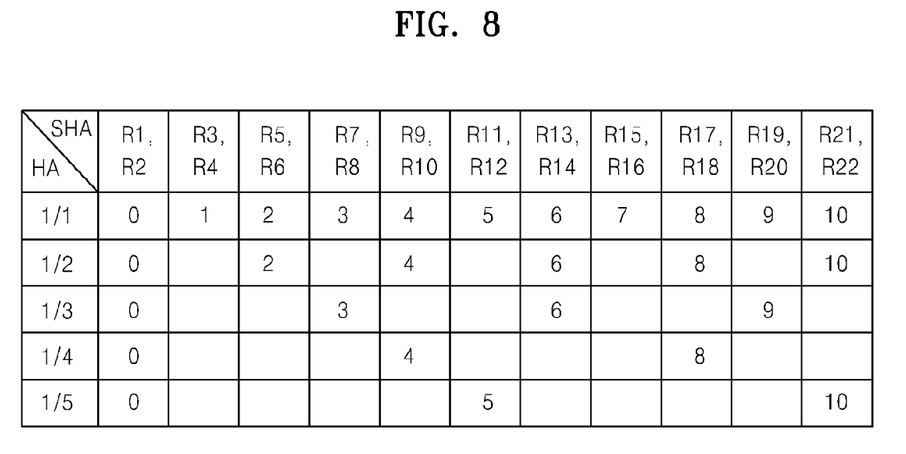
FIG. 8 illustrates a latch circuit selected in a 1/N sub-sampling mode, according to an embodiment.

FIG. 8 illustrates a selection of the latch circuits in the 1/N sub-sampling, according to an exemplary embodiment.

Referring to FIG. 8, in a normal sampling mode, that is, in a 1/1 sub-sampling mode (1/1), e.g., image data is output from all the latch circuits. When N is 2, that is, in a 1/2 sub-sampling mode (1/2), e.g., image data may be output from only the even latch circuits 0, 2 . . . 10. In a 1/3 sub-sampling mode (1/3), e.g., only 0th, 3rd, 6th, and 9th latch circuits are selected. In a 1/4 sub-sampling mode (1/4), e.g., only 0th, 4th, and 8th latch circuits are selected. In a 1/5 sub-sampling mode (1/5), e.g., only 0th, 5th, and 10th latch circuits are selected.

In one or more embodiments, an image sensor, e.g., the image sensor 100, may be configured according to the above-described exemplary methods may achieve a same result, but are slightly different from each other. Accordingly, one or more other embodiments may employ a method employing one or more features of each of the methods described above by comparing the relative advantages and disadvantages of the exemplary methods described above. More particularly, e.g., in the second method, two horizontal address decoders may be used. That is, in the second method, more decoders are used, but the speed of the horizontal address decoders is reduced by half, compared to the first method.

An image data processing method used to operate an image sensor 100 in both the normal sampling mode and the 1/N sub-sampling mode may be inferred with reference to FIGS. 3 through 8, and thus a detailed description thereof will be omitted here. A process for performing the image data processing method may be easily performed through operations of the elements in the above description.

In particular, one or more embodiments may be applied not only to an image sensor but also to an image data, processing system including a memory device storing image data. An image data processing system may reproduce image signals having improved quality not only when all image data stored in a memory device or all image data applied from outside is reproduced but also when sub-sampling is performed on image data. In particular, the image data processing system may have advantages in that the above functions may be performed without changing a circuit of a data processor for receiving image data and processing the image data.

Exemplary embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An image sensor supporting a normal sampling mode and a 1/N sub-sampling mode, the image sensor comprising:
   a sample and hold array including a plurality of latch circuits configured to store image data detected by a plurality of unit image sensors included in an image sensor array;
   a 2-channel transmission line block configured to connect image data output from the plurality of latch circuits to four transmission lines; and
   a horizontal address generator for generating a first channel selection control signal and a second channel selection control signal configured to control states and activation times of a plurality of switches, according to a horizontal address corresponding to addresses of the plurality of latch circuits, wherein:
   each of the latch circuits includes an output terminal connected to the four transmission lines via four switches,
   the first channel selection control signal controls the states of the switches for connecting two adjacent latch circuits, from among the plurality of latch circuits, to two of the four transmission lines,
   the second channel selection control signal controls the states of the switches for connecting two adjacent latch circuits adjacent to the latch circuits selected by the first channel selection control signal, from among the plurality of latch circuits, to the remaining two transmission lines, and
   times during which the first channel selection control signal and the second channel selection control signal corresponding to the activation times of the switches are activated at least partially overlap, and N is a natural number greater than 2.

2. The image sensor as claimed in claim 1 wherein, when the first channel selection control signal and the second channel selection control signal partially overlap, the horizontal address is output in series from one horizontal address decoder included in the horizontal address generator.

3. The image sensor as claimed in claim 2, wherein times during which the first channel selection control signal and the second channel selection control signal are activated overlap by about 50%.

4. The image sensor as claimed in claim 2, wherein the horizontal address generator comprises:
   a first D-type flip-flop configured to output the horizontal address as the first channel selection control signal via a positive output terminal of the first D-type flip-flop in accordance with a first clock signal, wherein the horizontal address is applied to an input terminal of the first D-type flip-flop; and
   a second D-type flip-flop configured to output the horizontal address as the second channel selection control signal via a positive output terminal of the second D-type flip-flop in accordance with a second clock signal, wherein the horizontal address is applied to an input terminal of the second D-type flip-flop, wherein the first clock signal and the second clock signal have the same frequency and different phases.

5. The image sensor as claimed in claim 4, wherein the phases of the first clock signal and the second clock signal are different by a half period.

6. The image sensor as claimed in claim 4, wherein
   an ON time of the first channel selection control signal is from a rising edge of the first clock signal to a next rising edge of the first clock signal, and
   an ON time of the second channel selection control signal is from a rising edge of the second clock signal to a next rising edge of the second clock signal.

7. The image sensor as claimed in claim 2, wherein, in the 1/N sub-sampling mode, the horizontal address decoder outputs in series horizontal addresses on which 1/N sub-sampling is to be performed.

8. The image sensor as claimed in claim 1, wherein, when an activated period of the first channel selection control signal and the second channel selection control signal entirely overlap, the addresses of the plurality of latch circuits are divided by two horizontal address decoders and then the addresses are output as a first horizontal address and a second horizontal address, the first channel selection control signal is activated in response to the first horizontal address output from a first horizontal address decoder, and the second channel selection control signal is activated in response to the second horizontal address output from a second horizontal address decoder.

9. The image sensor as claimed in claim 7, wherein, in the 1/N sub-sampling mode, the addresses of the plurality of latch circuits on which 1/N sub-sampling is to be performed are alternatively assigned to the first horizontal address decoder and the second horizontal address decoder.

10. The image sensor as claimed in claim 1, further comprising
a column amplifying array for amplifying image data detected by the plurality of unit image sensors constituting the image sensor array and for transmitting the image data to the sample & hold array.

11. An image data processing method of an image sensor for supporting both a normal sampling mode and a 1/N sub-sampling mode and for transmitting image data detected by a plurality of unit image sensors and stored in a plurality of latch circuits to a data processor using four transmission lines, the method comprising:
generating at least one horizontal address corresponding to addresses of a plurality of the latch circuits; and
generating a first channel selection control signal and a second channel selection control signal of which activation times at least partially overlap, wherein N is a natural number greater than 2, wherein:
each of the plurality of latch circuits has an output terminal that is connected to the four transmission lines via separated four switches,
the first channel selection control signal controls states of the switches for connecting two adjacent latch circuits, from among the plurality of latch circuits, to two of the four transmission lines; and
the second channel selection control signal controls states of the switches for connecting two adjacent latch circuits adjacent to the latch circuits selected by the first channel selection control signal, from among the plurality of latch circuits, to the remaining two transmission lines.

12. The method as claimed in claim 11 wherein, when activations of the first channel selection control signal and the second channel selection control signal partially overlap, the first channel selection control signal and the second channel selection control signal are generated using one horizontal address.

13. The method as claimed in claim 12, wherein the first channel selection control signal and the second channel selection control signal are generated using two clock signals having a same frequency and different phases.

14. The method as claimed in claim 13, wherein:
the activation time of the first channel selection control signal is from a rising edge of a first clock signal to a next rising edge of the first clock signal, and
the activation time of the second channel selection control signal is from a rising edge of a second clock signal to a next rising edge of the second clock signal.

15. The method as claimed in claim 14, wherein:
when the image sensor operates in the normal sampling mode, the horizontal address has information about all addresses of the plurality of latch circuits;
when the image sensor operates in the sub-sampling mode, the horizontal address has information about addresses selected according to a sampling ratio from among the addresses of the plurality of latch circuits; and
in both the normal sampling mode and the 1/N sub-sampling mode, the first channel selection control signal and the second channel selection control signal are alternatively activated.

16. The method as claimed in claim 11, further comprising, when the first channel selection control signal and the second channel selection control signal are activated entirely overlap,
dividing the horizontal address into a first horizontal address and a second horizontal address;
activating the first channel selection control signal in correspondence to the first horizontal address; and
activating the second channel selection control signal in correspondence to the second horizontal address.

17. An image data processing system supporting both a normal sampling mode and a 1/N sub-sampling mode, the system comprising:
a 2-channel transmission line block configured to connect image data detected by a plurality of unit image sensors and stored in a plurality of latch circuits to four transmission lines; and
a horizontal address generator configured to generate a first channel selection control signal and a second channel selection control signal for controlling states and activation times of a plurality of switches, according to a horizontal address corresponding to addresses of the plurality of latch circuits, wherein:
each latch circuit is coupled to the four transmission lines through corresponding ones of the switches, and
times during which the first channel selection control signal and the second channel selection control signal corresponding to the activation times of the switches are activated at least partially overlap, and N is a natural number greater than 2.

18. The system as claimed in claim 17, wherein the image data processing system is a complementary metal-oxide-semiconductor (CMOS) image sensor (CIS).

* * * * *